UNITED STATES PATENT OFFICE 2,557,328

SULFONATED ANTHRAPYRIMIDINES AND PROCESS OF PREPARING THE SAME

James Wardleworth, Manchester, England, assignor to Imperial Chemical Industries Limited, a corporation of Great Britain No Drawing. Application October 1, 1948, Serial No. 52,395. In Great Britain October 3, 1947

9 Claims. (Cl. 260—261)

This invention relates to new dyestuffs for wool and more particularly to new acid wool dyestuffs of the anthrapyrimidine series.

The anthrapyrimidines referred to in this specification are 2-aryl-1':9'-anthrapyrimidines, that is to say those compounds which contain in their structure the grouping —N—CR—N=, where R is an aryl nucleus, connected to the 1' and 9' carbon atoms of the anthraquinone nucleus to form a pyrimidine ring fused with the anthraquinone residue.

The system of numbering used for anthrapyrimidine derivatives in this specification is that given for the parent ring system in "The Ring Index," 1940, by Patterson and Capell, published by the Rheinhold Publishing Corporation, page 362, No. 2676.

In German specification No. 633,599 a process is described for the manufacture of wool dyestuffs by sulphonating certain anthrapyrimidines, including 6-anilino-, 6-p-toluidino- or 6-p-methoxyanilino-2-aryl-1':9'-anthrapyrimidines.

We have now found that valuable wool dyestuffs are obtained if instead of an anilino, p-toluidino or p-methoxyanilino group, there is substituted in the 6-position of the 2-aryl-1':9'-anthrapyrimidine a group of the formula

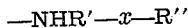

—NHR'—x—R"

where R', R" and x have the significance given below.

According to our invention therefore we provide a process for the manufacture of new dyestuffs for wool which comprises sulphonating 2-aryl-1'-:9'-anthrapyrimidines which contain as substituent in the 6-position a group of the formula —NH—R'—x—R" where R' is an arylene radical of the benzene series; R" is an arylradical of the benzene or naphthalene series, —x— stands for —O—, or a direct linkage and where R' and R" may carry further substituents.

The sulphonation may be carried out for example by stirring the 2-aryl-1':9'-anthrapyrimidine with sulphuric acid or dilute oleum at a suitable temperature until a sample of the sulphonation mixture is completely soluble in dilute aqueous ammonia solution.

Suitable starting materials for use in the invention are for example 6-(p-phenoxyanilino)-2-phenyl-1':9'-anthrapyrimidine, 6-(p-phenylanilino)-2-phenyl-1':9'-anthrapyrimidine and 6-(o-phenylanilino)-2-phenyl-1':9'-anthrapyrimidine.

The dyestuffs obtained by the process of the present invention dye wool in clear bright red shades of excellent fastness to light, washing and milling. As compared with the dyestuff of nearest shade described in the aforementioned specification, the dyestuffs obtained by the process of the present invention have the very valuable advantage that they show very much less variation in shade when applied to the wool under different conditions of dyeing.

The invention is illustrated but not limited by the following examples.

Example 1

3 parts of 6-(p-phenoxyanilino)-2-phenyl-1':9'-anthrapyrimidine (obtained as reddish-orange needles, M. P. 214–215° C., by condensing p-aminodiphenyl ether with 6-chloro-2-phenyl-1':9'-anthrapyrimidine) are dissolved with stirring at 0° C. in 55 parts of 100% sulphuric acid, and the solution is maintained at 0°–5° C. until a sample of the mixture is found to be soluble in dilute aqueous ammonia. This takes about 30 minutes. The reaction mixture is then poured onto ice, the dyestuff is filtered off, washed with 5% brine containing a little caustic soda, and dried to give a red powder. The product which is essentially the sodium salt of the monosulphonic acid, dissolves in hot water to give a red solution and dyes wool in bright red shades of very good fastness from a neutral or weakly acid dyebath.

Example 2

3 parts of 6-(p-phenylanilino)-2-phenyl-1':9'-anthrapyrimidine (orange-brown needles, M. P. 270–271° C., obtained by condensing p-aminodiphenyl with 6-chloro-2-phenyl-1':9'-anthrapyrimidine) are dissolved in 55 parts of 100% $H_2SO_4$ at 15–20° C., 40 parts of 20% oleum are added and the mixture is stirred at 50–52° C. until a sample of the product is soluble in cold dilute aqueous ammonia. This takes about 30 minutes. The reaction mixture is poured onto ice, and the precipitated solid is filtered off, and washed with 5% brine. The filter-cake is then stirred with 5% brine containing a little caustic soda. The suspension is warmed to 40° C., and filtered and the residue is washed with 5% brine and dried. The product is mainly the sodium salt of the disulphonic acid and dyes wool from a weakly acid bath in bright red shades of high fastness to washing, milling and light.

Example 3

3 parts of 6-(o-phenylanilino)-2-phenyl-1':9'-anthrapyrimidine (reddish-orange plates, M. P. 250–252° C., prepared by condensing o-aminodiphenyl with 6-chloro-2-phenyl-1':9'-anthrapyrimidine) are dissolved, with stirring, at 10–15° C. in 55 parts of 100% sulphuric acid and the mixture is heated to 20–25° C. for 45 minutes, then at 30–35° C. for 15 minutes. The product is isolated by pouring the acid solution onto ice, filtering off the precipitated solid, washing it with 5% brine containing a little caustic soda, then with 5% brine and finally drying to give a red powder. This compound which is essentially the sodium salt of the monosulphonic acid dyes wool from a neutral or weakly acid dyebath in attractive red shades of excellent fastness to light, washing and milling.

*Example 4*

5 parts of 6-(p-(p-tolyloxy)anilino)-2-phenyl-1':9'-anthrapyrimidine (prepared by condensing 4'-methyl-4-aminodiphenyl ether with 6-chloro-2-phenyl-1':9'-anthrapyrimidine) are dissolved in 60 parts of 5% oleum and the solution is stirred at room temperature until a test sample of the reaction mixture is found to be soluble in hot dilute ammonia. The product, which is essentially a disulphonic acid derivative, is isolated as described in Example 1. It is a red powder, which dyes wool in red shades from a neutral or weakly acid dyebath.

*Example 5*

5 parts of 6-(p-(p-chlorophenoxy)anilino)-2-phenyl-1':9'-anthrapyrimidine (obtained by condensing 6-chloro-2-phenyl-1':9'-anthrapyrimidine with 4'-chloro-4-aminodiphenyl ether) are dissolved at room temperature in 60 parts of 5% oleum. The reaction mixture is stirred until a test sample of the mixture is found to be soluble in hot dilute aqueous ammonia. This requires about 1 hour. The dyestuff which is essentially a disulphonic acid derivative is isolated as described in Example 1. It is a red powder which dissolves in hot water to give a bright red solution. It dyes wool in bright red shades from a neutral or weakly acid dyebath.

*Example 6*

The 6-(p-phenoxyanilino)-2-phenyl-1':9'-anthrapyrimidine used in Example 1 is replaced by the isomeric 6-(o-phenoxyanilino)-2-phenyl-1':9'-anthrapyrimidine. A red wool dyestuff is obtained which is similar in properties to the dyestuff of Example 1.

I claim:

1. A new wool dyestuff which in its acid form is represented by the formula

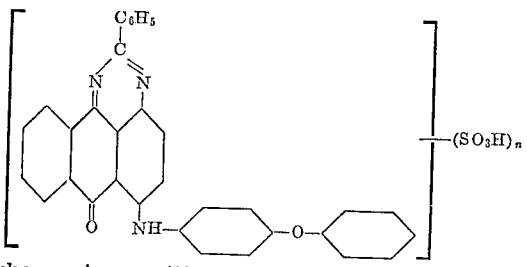

where $n$ is a positive integer up to 2.

2. A new wool dyestuff which in its acid form is represented by the formula

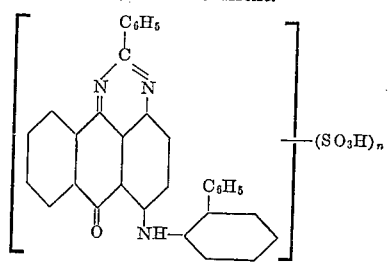

where $n$ is a positive integer up to 2.

3. A new wool dyestuff which in its acid form is represented by the formula

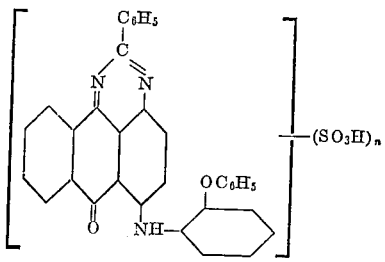

where $n$ is a positive integer up to 2.

4. Process for the manufacture of a new wool dyestuff which comprises sulphonating 6-(p-phenoxyanilino)-2-phenyl-1':9'-anthrapyrimidine.

5. Process for the manufacture of a new wool dyestuff which comprises sulphonating 6-(o-phenylanilino)-2-phenyl-1':9'-anthrapyrimidine.

6. Process for the manufacture of a new wool dyestuff which comprises sulphonating 6-(o-phenoxyanilino)-2-phenyl-1':9'-anthrapyrimidine.

7. A new wool dyestuff which in its acid form is represented by the formula

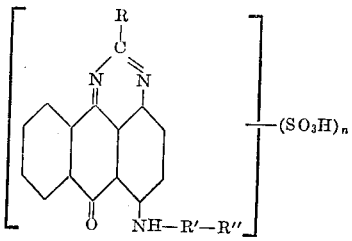

wherein R is a monocyclic aryl radical, R' is a monocyclic arylene radical, R'' is a radical selected from the group consisting of monocyclic and dicyclic aryl and aryloxy radicals, and $n$ is a positive integer up to 2.

8. Process for the manufacture of new dyestuffs for wool which comprises sulphonating 2-aryl-1':9'-anthrapyrimidines in which the aryl is a monocyclic aryl and which contain as a substituent in the 6-position a group of the formula —NH—R'—R'', wherein R' is a monocyclic arylene radical, and R'' is a radical selected from the group consisting of monocyclic and dicyclic aryl and aryloxy radicals.

9. Process for dyeing wool which comprises dyeing the wool from a dyebath having a pH of up to 7 with a sulphonic acid derivative of 2-aryl-1':9'-anthrapyrimidines in which the aryl is a monocyclic aryl, and which contain as a substituent in the 6-position a group of the formula —NH—R'—R'', wherein R' is a monocyclic arylene radical, and R'' is a radical selected from the group consisting of monocyclic and dicyclic aryl and aryloxy radicals.

JAMES WARDLEWORTH.

REFERENCES CITED

The following references are of record in the file of this patent:

UNITED STATES PATENTS

| Number | Name | Date |
|---|---|---|
| 2,040,859 | Kunz et al. | May 19, 1936 |
| 2,068,989 | Koeberle et al. | Jan. 26, 1937 |

FOREIGN PATENTS

| Number | Country | Date |
|---|---|---|
| 785,494 | France | May 20, 1935 |